United States Patent
Demoulin et al.

(10) Patent No.: US 11,845,053 B2
(45) Date of Patent: Dec. 19, 2023

(54) METHOD FOR PREPARING BIODEGRADABLE CAPSULES AND CAPSULES OBTAINED

(71) Applicant: CALYXIA, Bonneuil-sur-Marne (FR)

(72) Inventors: Damien Demoulin, Paris (FR); Todor Khristov, Paris (FR); Jamie Walters, Paris (FR); Alicia Sadaoui, Maisons Alfort (FR)

(73) Assignee: CALYXIA, Bonneuil-sur-Marne (FR)

( * ) Notice: Subject to any disclaimer, the term of this patent is extended or adjusted under 35 U.S.C. 154(b) by 0 days.

(21) Appl. No.: 16/613,178

(22) PCT Filed: May 15, 2018

(86) PCT No.: PCT/EP2018/062585
§ 371 (c)(1),
(2) Date: Nov. 13, 2019

(87) PCT Pub. No.: WO2018/210857
PCT Pub. Date: Nov. 22, 2018

(65) Prior Publication Data
US 2020/0164332 A1   May 28, 2020

(30) Foreign Application Priority Data
May 15, 2017   (FR) ...................................... 1754259

(51) Int. Cl.
*B01J 13/18*   (2006.01)
*C08F 2/50*   (2006.01)
*C08F 2/30*   (2006.01)

(52) U.S. Cl.
CPC ................ *B01J 13/18* (2013.01); *C08F 2/30* (2013.01); *C08F 2/50* (2013.01)

(58) Field of Classification Search
CPC ... B01J 13/18; B01J 13/14; C08F 2/30; C08F 2/50; C09K 5/063; F28D 20/023
See application file for complete search history.

(56) References Cited

U.S. PATENT DOCUMENTS

| | | | |
|---|---|---|---|
| 5,877,145 A | 3/1999 | Wahl et al. | |
| 5,938,581 A | 7/1999 | Bibette et al. | |
| 6,335,315 B1 | 1/2002 | Trinh et al. | |
| 2009/0289216 A1 | 11/2009 | Jung et al. | |
| 2010/0180995 A1* | 7/2010 | Teratani ................ | B60C 17/066 152/157 |
| 2012/0076843 A1 | 3/2012 | Jung et al. | |
| 2020/0038297 A1* | 2/2020 | Demoulin ................ | A61K 8/11 |

FOREIGN PATENT DOCUMENTS

| | | |
|---|---|---|
| CN | 103582476 A | 2/2014 |
| CN | 105828809 A | 8/2016 |
| EP | 3 144 058 A1 | 3/2017 |
| EP | 3 144 059 A1 | 3/2017 |
| FR | 3 031 914 A1 | 7/2016 |
| JP | 2001-181612 A | 7/2001 |
| WO | 2016/085741 A1 | 6/2016 |
| WO | 2016/085742 A1 | 6/2016 |
| WO | 2017/046360 A1 | 3/2017 |

OTHER PUBLICATIONS

International Search Report issued in corresponding International Patent Application No. PCT/EP2018/062585 dated Jun. 12, 2018 (in French).
French Search Report issued in corresponding French Patent Application No. 1754259 dated Jan. 24, 2018 (in French).
Agarwal, S., "Biodegradable Polymers: Present Opportunities and Challenges in Providing a Microplastic-Free Environment" Macromolucular Chemistry and Physics 221(2000017):1-7 (2020).
Bahheri, A. R., et al. "Fate of So-Called Biodegradable Polymers in Seawater and Freshwater" Global Challenges 1 (1700048):1-5 (2017).
Rudnik, E., et al. "Degradation behaviour of poly(lactic acid) films and fibres in soil under Mediterranean field conditions and laboratory simulations testing" Industrial Crops and Products 33;648-658 (2011).

* cited by examiner

*Primary Examiner* — Irina S Zemel
(74) *Attorney, Agent, or Firm* — TROUTMAN PEPPER HAMILTON SANDERS LLP

(57) ABSTRACT

The present invention relates to a method for preparing solid microcapsules, comprising the following steps a) adding, with stirring, a composition C1 to a polymeric composition C2 comprising at least one aliphatic or aromatic ester or polyester, additionally bearing at least one function selected from the group consisting of acrylate, methacrylate, vinyl ether, N-vinyl ether, epoxy, siloxane, amine, lactone, phosphate and carboxylate functions and mixtures thereof, whereby an emulsion (E1) is obtained comprising droplets of composition C1 dispersed in a composition C2; b) adding, with stirring, the emulsion (E1) to a composition C3 whereby a double emulsion (E2) is obtained comprising droplets dispersed in the composition C3; c) applying shear to the emulsion (E2) whereby a double emulsion (E3) is obtained comprising droplets of controlled size dispersed in the composition C3; and d) polymerizing the composition C2, whereby solid microcapsules dispersed in the composition C3 are obtained.

7 Claims, No Drawings

METHOD FOR PREPARING BIODEGRADABLE CAPSULES AND CAPSULES OBTAINED

CROSS REFERENCE TO RELATED APPLICATIONS

This is a U.S. National Phase Application under 35 U.S.C. § 371 of International Patent Application No. PCT/EP2018/062585, filed May 15, 2018, which claims priority of French Patent Application No. 17 54259, filed May 15, 2017. The entire contents of which are hereby incorporated by reference.

FIELD OF THE INVENTION

The subject of the present invention is a method for preparing biodegradable capsules. A further subject concerns the capsules such as obtained and compositions containing the same.

BACKGROUND

Numerous compounds, called active ingredients, are added to formulated products to impart properties thereto of advantageous application or to increase the performance thereof.

However, in numerous cases, these substances react negatively with other components of the formulated product, having harmful consequences on stability and reducing performance.

Encapsulation of active ingredients affords a very advantageous means for overcoming the limited performance or stability of formulated products containing the same, whilst benefiting from the effect of the active ingredient at the time of use of this formulated product.

Nevertheless, future treatment of microcapsules once they have released their content remains of major concern since they then become waste likely to accumulate in the environment. For this reason, the development of microcapsules capable of being biodegradable is of prime importance.

SUMMARY

A high number of capsules have been developed to isolate the active ingredients in formulated products. These capsules result from production processes such as spray-drying, interfacial polymerization, interfacial precipitation or solvent evaporation amongst many others.

Some of these microcapsules have a shell formed of a non-crosslinked material such as a hydrogel or thermoplastic polymer. If this hydrogel or this thermoplastic polymer is formed of materials known to be biodegradable, then the shell of microcapsules formed of this material will be deemed to be biodegradable. The chief biodegradable materials used for these types of capsules belong to the polyester family, in particular polyhydroxyalkanoates (e.g. polylactic acid or polyglycolic acid), or polysaccharides (e.g. alginate, starch or dextran). However, diffusion across the shell of this type of capsule is relatively rapid, thereby limiting the performance thereof. An encapsulated compound may quickly escape outside the capsule or, conversely, chemical species degrading the encapsulated compound may quickly enter the capsule.

Other microcapsules have a shell resulting from the reaction of monomers which interact chemically with each other and form a crosslinked material through which diffusion is much slower, thereby improving the performance of the capsules. In this category, mention can be made of capsules formed of urea and formaldehyde which are widely used but unfortunately are not biodegradable.

There is therefore a need for a technique to form capsules formed of a crosslinked shell, which are both biodegradable and have very good retaining and protecting properties for the active ingredients contained therein.

It is therefore the objective of the present invention to provide a method with which it is possible to encapsulate active ingredients whilst avoiding the above-mentioned leakage problems of said active ingredients, and to obtain capsules using this method.

A further objective of the present invention is to provide capsules containing at least one active ingredient and having excellent biodegradability properties.

The present invention therefore concerns a method for preparing solid microcapsules, comprising the following steps:

a) under stirring, adding a composition C1 comprising at least one active ingredient to a polymeric composition C2, compositions C1 and C2 not being miscible with each other, the viscosity of composition C2 being between 500 mPa·s and 100000 mPa·s at 25° C., and preferably being higher than the viscosity of composition C1, composition C2 comprising:

at least one monomer or polymer selected from the group formed by aliphatic or aromatic esters or polyesters, anhydrides or polyanhydrides, saccharides or polysaccharides, ethers or polyethers, amides or polyamides and carbonates or polycarbonates, additionally carrying at least one function selected from the group formed by acrylate, methacrylate, vinyl ether, N-vinyl ether, epoxy, siloxane, amine, lactone, phosphate, carboxylate functions, and mixtures thereof, at least one crosslinking agent, and optionally at least one photoinitiator or crosslinking catalyst, after which an emulsion (E1) is obtained comprising droplets of composition C1 dispersed in composition C2;

b) under stirring, adding emulsion (E1) to a composition C3, compositions C2 and C3 not being miscible with each other, the viscosity of composition C3 being between 500 mPa·s and 100000 mPa·s at 25° C., and preferably being higher than the viscosity of emulsion (E1), after which a double emulsion (E2) is obtained comprising droplets dispersed in composition C3;

c) applying shear to emulsion (E2), after which a double emulsion (E3) is obtained comprising droplets of controlled size dispersed in composition C3; and d) polymerizing composition C2, after which solid microcapsules are obtained dispersed in composition C3.

In the present application, the terms «microcapsules» and «capsules» are used indifferently.

With the method of the invention it is therefore possible to prepare solid microcapsules having a core and solid shell fully encapsulating the core on the periphery thereof, wherein the core is a composition C1 comprising at least one active ingredient.

Preferably, the solid microcapsules obtained with the method of the invention are formed of a core containing at least one active ingredient (composition C1) and a solid shell (obtained from composition C2) fully encapsulating said core on the periphery thereof.

In the search for microcapsules having good performance in terms of retention and protection, the inventors have surprisingly and unexpectedly found that it is possible under certain conditions to obtain biodegradable microcapsules from non-biodegradable materials.

Therefore, the microcapsules obtained with the method of the invention, having regard to the choice of specific monomers and polymers in composition C2, are capable of being biodegradable.

Biodegradability is defined herein as the ability to degrade in a natural medium such as defined in OECD standards: OECD 301 (Ready biodegradability), namely OECD 301 A (Dissolved Organic Carbon (DOC) Die-Away), OECD 301 B ($CO_2$ Evolution), OECD 301 C (Modified MITI (I) test), OECD 301 D (Closed Bottle test), OECD 301 E (Modified OECD Screening), OECD 301 F (Manometric Respirometry test), or further in OECD 304A (Inherent Biodegradability in Soil), OECD 306 (Biodegradability in Seawater) and OECD 310 (Ready Biodegradability—$CO_2$ in Sealed Vessels).

The method of the invention further has the advantage of not requiring the use of surfactants or emulsifiers which could accelerate and lead to uncontrolled release of the active ingredients outside the capsule; and/or could react with the components of the formulated product in which the capsules are intended to be incorporated.

In the invention a double emulsion is produced that is composed of droplets containing at least one active ingredient, surrounded by a crosslinkable liquid phase. These double droplets are then made monodisperse in size before being converted via crosslinking or polymerization to rigid capsules. The preparation involves 4 steps described below in detail.

Step a)

At step a) of the method of the invention, a first emulsion (E1) is prepared.

The first emulsion is composed of a dispersion of droplets of composition C1 (containing at least one active ingredient) in a polymeric composition C2 immiscible with C1, created by adding C1 dropwise to C2 under stirring.

At step a), a composition C1 is added to a crosslinkable polymeric composition C2, this step being conducted under stirring which means that composition C2 is kept under agitation typically mechanically whilst composition C1 is added, to emulsify the mixture of compositions C1 and C2.

The adding of composition C1 to composition C2 is typically conducted dropwise.

Throughout step a), composition C1 is at a temperature of between 0° C. and 100° C., preferably between 10° C. and 80° C., and more preferably between 15° C. and 60° C. Throughout step a), composition C2 is at a temperature of between 0° C. and 100° C., preferably between 10° C. and 80° C., and more preferably between 15° C. and 60° C.

Under the conditions for addition at step a), compositions C1 and C2 are not miscible with each other, which means that the amount (by weight) of composition C1 capable of being solubilized in C2 is equal to or lower than 5%, preferably lower than 1%, and more preferably lower than 0.5% relative to the total weight of composition C2, and that the amount (by weight) of composition C2 capable of being solubilized in composition C1 is equal to or lower than 5%, preferably lower than 1%, and more preferably lower than 0.5% relative to the total weight of composition C1.

Therefore, when composition C1 comes into contact with C2 under agitation, it is dispersed in the form of droplets called single droplets.

The immiscibility between compositions C1 and C2 also allows prevented migration of the active ingredient of composition C1 towards composition C2.

Composition C2 is stirred to form an emulsion comprising droplets of composition C1 dispersed in composition C2. This emulsion is also called a «single emulsion» or C1-in-C2 emulsion.

To carry out step a), it is possible to use any type of mixer usually used to form emulsions e.g. a mechanical blade mixer, static emulsifier, ultrasonic homogenizer, membrane homogenizer, high-pressure homogenizer, colloidal mixer, high-shear disperser or high-speed homogenizer.

Composition C1

Composition C1 comprises at least one active ingredient A. This composition C1 acts as carrier for active ingredient A in the method of the invention, within the droplets formed during the method of the invention and in the solid capsules obtained.

In a first variant of the method of the invention, composition C1 is monophase i.e. it is the active ingredient A alone or it is a solution comprising active ingredient A in solubilized form.

In one embodiment, the active ingredient is solubilized in composition C1.

In this variant, composition C1 is typically composed of a solution of active ingredient A in an aqueous solution or organic solvent, or a mixture of organic solvents, active ingredient A being contained in a weight content of between 1% to 99% relative to the total weight of composition C1. Active ingredient A can be contained in a weight content of between 5% to 95%, 10% to 90%, 20% to 80%, 30% to 70% or 40% to 60% relative to the total weight of composition C1.

In one embodiment, composition C1 consists of active ingredient A.

In another embodiment of the invention, composition C1 is a biphasic composition, which means that the active ingredient is dispersed either in liquid form or in solid form in composition C1 and is not fully solubilized in said composition C1.

In one embodiment, the active ingredient is dispersed in the form of solid particles in composition C1.

In this embodiment, composition C1 may be composed of a dispersion of solid particles of the active ingredient in an organic solvent or in a mixture of organic solvents.

In this embodiment, composition C1 may be composed of a dispersion of solid particles of the active ingredient in an aqueous phase which comprises water and possibly hydrophilic organic solvents.

For example, the active ingredient used is:
- a crosslinker, hardener, organic or metallic catalyst (such as an organometallic or inorganometallic complex of platinum, palladium, titanium, molybdenum, copper, zinc) used to polymerize formulations of polymer, elastomer, rubber, paint, adhesive, sealant, mortar, varnish or coating;
- a colouring agent or pigment intended for formulations of elastomers, paint, coatings, adhesives, sealant, mortar or paper;
- a fragrance (in the meaning of the list of molecules drawn up by the International Fragrance Association (IFRA) and available on the website www.ifraorg.org) intended for detergents such as washing products, home cleaning products, cosmetic and personal hygiene products, textiles, paints, coatings;

a flavour, vitamin, amino acid, protein, lipid, probiotic, antioxidant, pH corrector, preserving agent for food compounds and animal feed;

a softener, conditioner for detergents, washing products, cosmetics and personal hygiene products. In this respect, the active ingredients which can be used are listed for example in U.S. Pat. Nos. 6,335,315 and 5,877,145;

a colour anti-fading agent (e.g. derivative of ammonium), anti-foaming agent (e.g. an alcohol ethoxylate, alkylbenzene sulfonate, polyethylene ethoxylate, an alkylethoxysulfate or alkylsulfate) intended for detergents, washing products, and home cleaning products;

an optical brightening agent also called colour activator (e.g. a stilbene derivative, coumarin derivative, pyrazoline derivative, benzoxazole derivative or naphthalimide derivative) intended for detergents, washing products, cosmetics and personal hygiene products;

a biologically active compound such as an enzyme, vitamin, protein, plant extract, emollient, disinfectant, antibacterial agent, anti-UV agent, medicinal product intended for cosmetic and personal hygiene products, for textiles. Among these biologically active compounds mention can be made of: vitamins A, B, C, D and E, para aminobenzoic acid, alpha hydroxylated acids (e.g. glycolic acid, lactic acid, malic acid, tartaric acid or citric acid), camphor, ceramides, polyphenols (e.g. flavonoids, phenolic acid, ellagic acid, tocopherol, ubiquinol), hydroquinone, hyaluronic acid, isopropyl isostearate, isopropyl palmitate, oxybenzone, panthenol, proline, retinol, retinyl palmitate, salicylic acid, sorbic acid, sorbitol, triclosan, tyrosine;

a disinfecting agent, antibacterial agent, anti-UV agent intended for paints and coatings;

a fertilizer, herbicide, insecticide, pesticide, fungicide, repelling or disinfecting product intended for agrichemical products;

A flame retarding agent (e.g. a brominated polyol such as tetrabromobisphenol A, halogenated or non-halogenated organophosphorus compound, chlorinated compound, aluminium trihydrate, antimony oxide, zinc borate, red phosphorus, melamine, or magnesium dihydroxide) intended for plastic materials, coatings, paints and textiles;

a photonic crystal or photochromophore intended for paints, coatings and polymer materials forming incurved and flexible screens;

a product known to skilled persons under the name Phase Change Materials (PCMs) capable of absorbing or releasing heat when they undergo a phase change, intended for energy storage. Examples of PCMs and their applications are described in "A review on phase change energy storage: materials and applications", Farid et al., Energy Conversion and Management, 2004, 45(9-10), 1597-1615. As examples of PCMs, mention can be made of aluminium phosphate molten salts, ammonium carbonate, ammonium chloride, caesium carbonate, caesium sulfate, calcium citrate, calcium chloride, calcium hydroxide calcium oxide, calcium phosphate, calcium saccharate, calcium sulfate, cerium phosphate, iron phosphate, lithium carbonate, lithium sulfate, magnesium chloride, magnesium sulfate, manganese chloride, manganese nitrate, manganese sulfate, potassium acetate, potassium carbonate, potassium chloride, potassium phosphate, rubidium carbonate, rubidium sulfate, disodium tetraborate, sodium acetate, sodium bicarbonate, sodium bisulfate, sodium citrate, sodium chloride, sodium hydroxide, sodium nitrate, sodium percarbonate, sodium persulfate, sodium phosphate, sodium propionate, sodium selenite, sodium silicate, sodium sulfate, sodium tellurate, sodium thiosulfate, strontium, hydrophosphate, zinc acetate, zinc chloride, sodium thiosulfate, hydrocarbon paraffin waxes, polyethylene glycols.

Composition C2

Composition C2 is intended to form the future solid shell of the microcapsules.

The volume fraction of C1 in C2 can vary from 0.1 to 0.6 to control the thickness of the shell of the capsules obtained on completion of the method.

In one embodiment, the ratio between the volume of composition C1 and the volume of composition C2 varies between 1:10 and 10:1. Preferably, this ratio is between 1:3 and 5:1, more preferably between 1:3 and 3:1.

Preferably, the viscosity of composition C2 at 25° C. is between 1000 mPa·s and 50000 mPa·s, more preferably between 2000 mPa·s and 25000 mPa·s, for example it is between 3000 mPa·s and 15000 mPa·s.

Preferably, the viscosity of composition C2 is higher than the viscosity of composition C1.

Viscosity is measured using a Haake Rheostress™ 600 rheometer equipped with cone of diameter 60 mm having 2-degree angle, and a temperature control cell set at 25° C. The value of viscosity is read off at a shear rate of 10 s$^{-1}$.

In this embodiment, the destabilizing kinetics of the droplets of emulsion (E1) are significantly slow, allowing the shell of the microcapsules to be polymerized at step d) before the emulsion become unstable. Polymerization, once completed, then provides thermodynamic stabilization. Therefore, the relatively high viscosity of composition C2 ensures the stability of emulsion (E1) obtained after step a).

Preferably, the interfacial tension between compositions C1 and C2 is low. Typically, these interfacial tensions vary between 0 mN/m and 50 mN/m, more preferably between 0 mN/m and 20 mN/m.

The low interfacial tension between compositions C1 and C2 also advantageously allows the ensured stability of emulsion (E1) obtained after step a).

Composition C2 contains at least one monomer or polymer such as defined below, at least one crosslinking agent and optionally at least one photoinitiator or crosslinking catalyst, making the composition crosslinkable.

In one embodiment, composition C2 comprises from 50% to 99% by weight of monomer or polymer such as defined below, or a mixture of monomers and polymers such as defined below, relative to the total weight of composition C2.

In one embodiment, composition C2 comprises from 1% to 20% by weight of crosslinking agent or a mixture of crosslinking agents, relative to the total weight of composition C2.

In one embodiment, composition C2 comprises from 0.1% to 5% by weight of photoinitiator or a mixture of photoinitiators, relative to the total weight of composition C2.

In one embodiment, composition C2 comprises from 0.001% to 20% by weight of crosslinking agent relative to the weight of said composition C2.

In the invention, the term «monomer» or «polymer» designates any base unit adapted for the formation of a solid material via polymerization, either alone or in combination with other monomers or polymers. The term «polymer» also encompasses oligomers.

These monomers are selected from among monomers comprising at least one reactive function selected from the group formed by acrylate, methacrylate, vinyl ether, N-vinyl ether, epoxy, siloxane, amine, lactone, phosphate and carboxylate functions.

The monomers or polymers used in composition C2 are selected from among aliphatic or aromatic esters or polyesters, anhydrides or polyanhydrides, saccharides or polysaccharides, ethers or polyethers, amides or polyamides, and carbonates or polycarbonates, said polymers additionally carrying at least one reactive function selected from the group formed by acrylate, methacrylate, vinyl ether, N-vinyl ether, epoxy, siloxane, amine, lactone, phosphate, and carboxylate functions.

Preferably, the monomers or polymers used in composition C2 are selected from among aliphatic or aromatic esters of polyesters, anhydrides or polyanhydrides, saccharides or polysaccharides, ethers or polyethers, amides or polyamides, and carbonates or polycarbonates, said polymers additionally carrying at least one reactive function selected from the group formed by acrylate, methacrylate, vinyl ether, N-vinyl ether, epoxy, siloxane, amine, lactone, phosphate, and carboxylate functions, said above-listed monomers or polymers not carrying any other reactive function differing from acrylate, methacrylate, vinyl ether, N-vinyl ether, epoxy, siloxane, amine, lactone, phosphate and carboxylate functions.

In one embodiment, the monomers or polymers used in composition C2 do not carry any urethane function.

Preferably, the monomers or polymers used in composition C2 are selected from among aliphatic or aromatic esters or polyesters, anhydrides or polyanhydrides, saccharides or polysaccharides, ethers or polyethers, amides or polyamides and carbonates or polycarbonates, said polymers additionally carrying at least one reactive function selected from the group formed by acrylate, methacrylate, vinyl ether, N-vinyl ether, epoxy, siloxane, amine, lactone, phosphate, and carboxylate functions, said monomers or polymers not carrying a urethane function.

Preferably, the monomers or polymers used in composition C2 are selected from among aliphatic or aromatic esters or polyesters, anhydrides or polyanhydrides, saccharides or polysaccharides, ethers or polyethers, amides or polyamides, and carbonates or polycarbonates, said polymers additionally carrying a single reactive function selected from the group formed by acrylate, methacrylate, vinyl ether, N-vinyl ether, epoxy, siloxane, amine, lactone, phosphate and carboxylate functions. Therefore, in this embodiment, the monomers or polymers of composition C2 do not carry a function other than those listed above, and hence in particular do not carry a urethane function.

Among the examples of such monomers or polymers, nonlimiting mention can be made of the following compounds and mixtures thereof:
  the family of aliphatic or aromatic esters and polyesters particularly comprising polyglycolides (PGAs), polylactides (PLAs), poly(lactide-co-glycolide) (PLGAs), poly(ortho esters) e.g. polycaprolactone (PCL), polydioxanone, poly(ethylene succinate), poly(butylene succinate) (PBS), poly(ethylene adipate), poly(butylene adipate), poly(ethylene sebacate), poly(butylene sebacate), poly(valerolactone) (PVL), poly(decalactone), polyhydroxyvalerate, poly(beta-malic acid), poly-3-hydroxybutyrate (PHB), poly-3-hydroxy-butyrate-co-3-hydroxyvaldrate (P-3HB-3HV), poly-3-hydroxybutyrate-co-4-hydroxybutyrate (P-3HB-4HB), poly-3-hydroxybutyrate-co-3-hydroxyvalerate-co-4-hydroxybutyrate (P-3HB-3HV-4HB), poly (3-hydroxyvalerate), poly(3-hydroxypropionate), poly (3-hydroxycaproate), poly (3-hydroxyoctanoate), poly (3-hydroxydecanoate), poly(3-hydroxyundecanoate), poly(3-hydroxydodecanoate), poly(3-hydroxybutyrate-co-3-hydroxyvalerate), poly(3-hydroxybutyrate-co-3-hydroxydecanoate), poly(3-hydroxybutyrate-co-3-hydroxypropionate), poly(3-hydroxybutyrate-co-3-hydroxyoctanoate), poly(3-hydroxyheptanoate), poly (3-hydroxyhexanoate), poly(2-hydroxybutyrate), poly (3-hydroxybutyrate-co-4-hydroxybutyrate), poly(3-hydroxybutyrate-co-3-hydroxyhexanoate), poly(3-hydroxybutyrate-co-3-hydroxyhexanoate), poly(4-hydroxybutyrate), poly(4-hydroxybutyrate-co-2-hydroxybutyrate), poly(4-hydroxypropionate), poly(4-hydroxyvalerate), poly(5-hydroxybutyrate), poly(5-hydroxyvalerate), poly(6-hydroxyhexanoate), poly (alkylene alkanoate), poly(alkylene dicarboxylate), poly(butylene adipate), poly(butylene adipate-co-terephthalate), poly(butylene carbonate), poly(butylene pimelate), poly(butylene succinate), poly(butylene succinate-co-adipate), poly(butylene succinate-co-carbonate), poly(butylene sebacate), poly(butylene sebacate-co-terephthalate), poly(butylene succinate-co-terephthalate), poly(butylene succinate-co-lactate), poly(cyclohexene carbonate), polydiaxanone, poly(ethylene azelate), poly(ethylene carbonate), poly(ethylene decamethylate), poly(ethylene furanoate), poly(ethylene oxalate), poly(ethylene succinate), poly(ethylene succinate-co-adipate), poly(ethylene sebacate), poly (ethylene succinate-co-terephthalate), poly(ethylene suberate), poly(hexamethylene sebacate), poly(glycolide-co-caprolactone), poly(lactide-co-epsilon-caprolactone), polymandelide, poly (B-malic acid), poly(b-propiolactone), poly(propylene succinate), poly (tetramethylene adipate-co-terephthalate), poly(tetramethylene carbonate), poly(trimethylene carbonate), poly(tetramethylene succinate)-co-(tetramethylene carbonate), poly(trimethylene adipate), poly(methylene adipate-co-terephthalate), poly(tetramethylene adipate), poly(tetramethyl glycolide), poly(butylene succinate), poly(valerolactone), additionally carrying at least one reactive function selected from the group formed by acrylate, methacrylate, vinyl ether, N-vinyl ether, epoxy, siloxane, amine, lactone, phosphate and carboxylate functions;
  the family of anhydrides or polyanhydrides such as those derived from poly(sebacic acid), poly(adipic acid), polyterephthalic acid, poly(bis(p-carboxyphenoxy)alkane acid, or more generally polyanhydrides described for example in *Advanced Drug Delivery Reviews* 54 (2002) 889-910, additionally carrying at least one reactive function selected from the group formed by acrylate, methacrylate, vinyl ether, N-vinyl ether, epoxy, siloxane, amine, lactone, phosphate and carboxylate functions;
  the family of saccharides and polysaccharides, particularly comprising carrageenans, dextrans, cyclodextrins e.g. hyaluronic acid, agarose, chitosan, chitin, alginate, starch, cellulose and derivatives thereof such as methyl cellulose, ethyl cellulose, hydroxyethyl cellulose, methylhydroxyethyl cellulose, ethylhydroxyethyl cellulose, carboxymethyl cellulose, hydroxypropyl cellulose or methylhydroxypropyl cellulose, additionally carrying at least one reactive function selected from the group formed by acrylate, methacrylate, vinyl ether, N-vinyl ether, epoxy, siloxane, amine, lactone, phosphate and carboxylate functions;

the family of ethers and polyethers particularly comprising polyethylene glycols, additionally carrying at least one reactive function selected from the group formed by acrylate, methacrylate, vinyl ether, N-vinyl ether, epoxy, siloxane, amine, lactone, phosphate and carboxylate functions; and the family of amides and polyamides, particularly comprising poly(ester amide)s or polyphthalamides, additionally carrying at least one reactive function selected from the group formed by acrylate, methacrylate, vinyl ether, N-vinyl ether, epoxy, siloxane, amine, lactone, phosphate and carboxylate functions.

Preferably, the monomers or polymers used in composition C2 are selected from among aliphatic or aromatic esters or polyesters additionally carrying at least one reactive function selected from the group formed by acrylate, methacrylate, vinyl ether, N-vinyl ether, epoxy, siloxane, amine, lactone, phosphate and carboxylate functions, said monomers or polymers not carrying a urethane function.

Preferably, the monomers or polymers used in composition C2 are not aliphatic or aromatic esters or polyesters carrying at least one urethane function.

By «crosslinking agent» it is meant a compound carrying at least two reactive functions able to crosslink a monomer or polymer, or a mixture of monomers or polymers, when it is polymerized.

The crosslinking agent can be selected from among molecules carrying at least two same or different functions selected from the group formed by acrylate, methacrylate, vinyl ether, N-vinyl ether, epoxy, siloxane, amine, lactone, phosphate and carboxylate functions.

As crosslinking agent particular mention can be made of:

diacrylates e.g. 1,6-hexanediol diacrylate, 1,6-hexanediol dimethacrylate, polyethylene glycol diacrylate, polyethylene glycol dimethacrylate, 1,9-nonanediol dimethacrylate, 1,4-butanediol dimethacrylate, 1,3-butanediol dimethacrylate, 1,10-decanediol dimethacrylate, bis(2-methacryloxyethyl) N,N'-1,9-nonylene biscarbamate, 1,4-butanediol diacrylate, 1,5-pentanediol dimethacrylate, allyl methacrylate, N,N'-methylenebisacrylamide, 2,2-bis[4-(2-hydroxy-3-methacryloxypropoxy)phenyl]propane, tetraethylene glycol diacrylate, diethylene glycol diacrylate, triethylene glycol diacrylate, triethylene glycol dimethacrylate, polyethylene glycol diglycidyl ether, N,N-diallylacrylamide or glycidyl methacrylate;

multifunctional acrylates e.g. dipentaerythritol pentaacrylate, 1,1,1-trimethylolpropane triacrylate, 1,1,1-trimethylolpropane trimethacrylate, ethylenediamine tetramethacrylate, pentaerythritol triacrylate or pentaerythritol tetraacrylate; and acrylates also having another reactive function e.g. propargyl methacrylate, N-acryloxysuccinimide, N-(2-Hydroxypropyl) methacrylamide, N-(t-BOC-aminopropyl) methacrylamide, monoacryloxyethyl phosphate, acrylic anhydride, 2-(tert-butylamino) ethyl methacrylate, N,N-diallylacrylamide or glycidyl methacrylate.

In one embodiment, composition C2 comprises from 0.001 to 20 weight % of crosslinking agent(s) relative to the total weight of said composition.

By «photoinitiator» it is meant a compound capable of fragmenting under the effect of light radiation.

The photoinitiators which can be used in the present invention are known in the art and are described for example in "*Les photoinitiateurs dans la réticulation des revêtements*" (Photoinitiators in the crosslinking of coatings) G. Li Bassi, *Double Liaison-Chimie des Peintures*, No 361, November 1985, p. 34-41; "*Applications industrielles de la polymérisation photoinduite*" (Industrial applications of photoinduced polymerization) Henri Strub, *L'Actualité Chimique*, February 2000, p. 5-13; and "*Photopolymères: considérations théoriques et réaction de prise*" (Photopolymers: theoretical considerations and curing reaction), Marc, J. M. Abadie, *Double Liaison-Chimie des Peintures*, No 435-436, 1992, p. 28-34.

These photoinitiators encompass:

α-hydroxyketones e.g. 2-hydroxy-2-methyl-1-phenyl-1-propanone marketed for example under the trade names DAROCUR® 1173 and 4265, IRGACURE® 184, 2959 and 500 by BASF, and ADDITOL® CPK by CYTEC;

α-aminoketones in particular 2-benzyl-2-dimethylamino-1-(4-morpholinophenyl)-butanone-1, marketed for example under the trade names IRGACURE® 907 and 369 by BASF;

aromatic ketones marketed for example under the trade name ESACURE® TZT by LAMBERTI; or thioxanthones marketed for example under the trade name ESACURE® ITX by LAMBERTI, and quinones. These aromatic ketones most often require the presence of a hydrogen-donor compound such as tertiary amines and alkanolamines in particular. The tertiary amine ESACURE® EDB can particularly be cited marketed by LAMBERTI;

α-dicarbonyl derivatives most frequently represented by benzyldimethylketal marketed under the trade name IRGACURE® 651 by BASF. Other commercially available products are marketed by LAMBERTI under the trade name ESACURE® KB1; and acylphosphine oxides e.g. bis-acylphosphine oxides (BAPO) marketed for example under the trade names IRGACURE® 819, 1700 and 1800, DAROCUR® 4265, LUCIRIN® TPO, and LUCIRIN® TPO-L by BASF.

Among the photoinitiators, mention can also be made of aromatic ketones such as benzophenone, phenylglyoxylates e.g. the methyl ester of phenyl glyoxylic acid, oxime esters such as [1-(4-phenylsulfanylbenzoyl)heptylideneamino] benzoate, sulfonium salts, iodonium salts and oxime sulfonates.

In one embodiment, composition C2 may also comprise an additional monomer or polymer capable of improving the properties of the shell of the microcapsules and/or of imparting novel properties to the shell of the microcapsules.

Among these additional monomers or polymers, mention can be made of the monomers or polymers carrying a pH-sensitive group or a group sensitive to temperature, UV or IR.

These additional monomers or polymers can induce rupture of the solid microcapsules followed by release of their content, after stimulation via pH, temperature, UV or IR for example.

These additional monomers or polymers can be selected from among the monomers or polymers carrying at least one of the following groups:

a pH-sensitive group such as primary, secondary or tertiary amines, carboxylic acids, phosphate, sulfate, nitrate or carbonate groups;

a UV-sensitive or UV-cleavable group (photochromic group) such as the azobenzene, spiropyrane, 2-diazo-1,2-naphthoquinone, o-nitrobenzyl, thiol groups, or 6-nitro-veratroyloxycarbonyl, e.g. poly(ethylene oxide)-block-poly(2-nitrobenzylmethacrylate), and other block copolymers such as described in particular in Liu et al., *Polymer Chemistry* 2013, 4, 3431-3443;

an IR-sensitive or IR-cleavable group such as o-nitrobenzyl or 2-diazo-1,2-naphthoquinone, e.g. the polymers described in Liu et al., *Polymer Chemistry* 2013, 4, 3431-3443;

a hydrolysis-sensitive group such as poly(lactic acid), poly(glycolic acid), poly(lactic-co-glycolic acid), polycaprolactone, polyhydroxybutyrate, chitosan, dextran, agarose, cellulose and the derivatives of these compounds; and a temperature-sensitive group such as poly(N-isopropylacrylamide).

Step b)

At step b) of the method of the invention, a second emulsion (E2) is prepared.

The second emulsion is composed of a dispersion of droplets of the first emulsion in a composition C3 immiscible with C2, created through the dropwise addition of emulsion (E1) to C3 under stirring.

Throughout step b), emulsion (E1) is at a temperature of between 15° C. and 60° C. Throughout step b), composition C3 is at a temperature of between 15° C. and 60° C.

Under the conditions for addition at step b), compositions C2 and C3 are not miscible with each other, which means that the amount (by weight) of composition C2 capable of being solubilized in composition C3 is equal to or lower than 5%, preferably lower than 1%, and more preferably lower than 0.5% relative to the total weight of composition C3, and that the amount (by weight) of composition C3 capable of being solubilized in composition C2 is equal to or lower than 5%, preferably lower than 1%, and more preferably lower than 0.5% relative to the total weight of composition C2.

Therefore, when emulsion E1) comes into contact with composition C3 under agitation, it is dispersed in the form of droplets called double droplets, the dispersion of these droplets of emulsion (E1) in the C3 continuous phase being called emulsion (E2).

Typically, a double droplet formed at step b) corresponds to a single droplet of composition C1 such as described above, surrounded by a shell of composition C2 which fully encapsulates said single droplet.

The double droplet formed at step b) may also comprise at least two single droplets of composition C1, said single droplets being surrounded by a shell of composition C2 which fully encapsulates said single droplets.

Therefore, said double droplets comprise a core composed of one or more single droplets of composition C1, and a layer of composition C2 surrounding said core.

The resulting emulsion (E2) is generally a polydisperse double emulsion (C1-in C2-in C3 emulsion, or C1/C2/C3 emulsion), which means that the double droplets do not have a distinct size distribution in emulsion (E2).

The immiscibility between compositions C2 and C3 allows prevented mixing between the layer of composition C2 and composition C3, and thereby ensures the stability of emulsion (E2).

The immiscibility between compositions C2 and C3 also allows prevented migration of the water-soluble substance of C1 from the core of the droplets towards composition C3.

To implement step b), it is possible to use any type of mixer usually used to form emulsions, e.g. a mechanical blade mixer, static emulsifier, ultrasonic homogenizer, membrane homogenizer, high-pressure homogenizer, colloidal mixer, high-shear disperser or high-speed homogenizer.

Composition C3

In one embodiment, the viscosity of composition C3 at 25° C. is higher than the viscosity of emulsion (E1) at 25° C.

In the invention, the viscosity of composition C3 at 25° C. is between 500 mPa·s and 100000 mPa·s.

Preferably, the viscosity of composition C3 at 25° C. is between 3000 mPa·s and 100000 mPa·s, more preferably between 5000 mPa·s and 80000 mPa·s, e.g. between 7000 mPa·s and 70000 mPa·s.

In this embodiment, given the very high viscosity of the continuous phase formed by composition C3, the rate of destabilization of the double droplets of emulsion (E2) is significantly slow compared with the duration of the method of the invention, which therefore affords kinetic stabilization of emulsion (E2) and then of (E3) until polymerization of the shell of the capsules is completed. Once polymerized, the capsules are thermodynamically stable.

Therefore, the very high viscosity of composition C3 ensures the stability of emulsion (E2) obtained after step b).

Low surface tension between C3 and the first emulsion as well as high viscosity of the system advantageously allow ensured kinetic stability of the double emulsion (E2), preventing dephasing thereof throughout the production time.

Preferably, the interfacial tension between compositions C2 and C3 is low. This low interfacial tension between compositions C2 and C3 also advantageously allows ensured stability of emulsion (E2) obtained after step b).

The volume fraction of the first emulsion in C3 can be varied between 0.05 and 0.5 first to improve production yield and secondly to vary the mean diameter of the capsules. On completion of this step, the size distribution of the second emulsion is relatively wide.

In one embodiment, the ratio between the volume of emulsion (E1) and the volume of composition C3 varies between 1:10 and 10:1. Preferably, this ratio is between 1:9 and 3:1, more preferably between 1:9 and 1:1.

In one embodiment, composition C3 also comprises at least one branched polymer, preferably having a molecular weight higher than 5000 g·mol$^{-1}$, and/or at least one polymer having a molecular weight higher than 5000 g·mol$^{-1}$, and/or solid particles such as silicates.

In one embodiment, composition C3 comprises at least one branched polymer, preferably of molecular weight higher than 5000 g·mol$^{-1}$, more preferably between 10000 g·mol$^{-1}$ and 500000 g·mol$^{-1}$, for example between 50000 g·mol$^{-1}$ and 300000 g·mol$^{-1}$.

By «branched polymer» it is meant a polymer having at least one branch point between its two terminal groups, a branch point being a point on a chain on which a side chain is attached also called a branch or pendant chain.

Among branched polymers, mention can be made of grafted polymers, comb or star polymers or dendrimers.

In one embodiment, composition C3 comprises at least one polymer having a molecular weight higher than 5000 g·mol$^{-1}$, more preferably between 10000 g·mol$^{-1}$ and 500000 g·mol$^{-1}$, for example between 50000 g·mol$^{-1}$ and 300000 g·mol$^{-1}$.

As polymer able to be used in composition C3, the following compounds can be cited, used alone or mixed together:

cellulose derivatives such as cellulose ethers: methyl cellulose, ethyl cellulose, hydroxyethyl cellulose, methylhydroxyethyl cellulose, ethylhydroxyethyl cellulose, carboxymethyl cellulose, hydroxypropyl cellulose or methylhydroxypropyl cellulose;

polyacrylates (also called carbomers), such as polyacrylic acid (PAA), polymethacrylic acid (PMAA), poly(hydroxyethyl methacrylate) (pHEMA), poly(N-2-hydroxypropyl methacrylate) (pHPMA);

polyacrylamides such as poly(N-isopropylacrylamide) (PNIPAM);

polyvinylpyrrolidone (PVP) and derivatives thereof;

polyvinyl alcohol (PVA) and derivatives thereof;

poly(ethylene glycol), poly(propylene glycol) and derivatives thereof, such as poly(ethylene glycol) acrylate/methacrylate, poly(ethylene glycol) diacrylate/dimethacrylate, polypropylene carbonate;

polysaccharides such as carrageenans, locust bean gums or tara gums, dextran, xanthan gums, chitosan, agarose, hyaluronic acids, gellan gum, guar gum, gum arabica, gum tragacanth, diutan gum, oat gum, karaya gum, gum ghatti, curdlan gum, pectin, konjac gum, starch;

protein derivatives such as gelatine, collagen, fibrin, polylysine, albumin, casein;

silicone derivatives such as polydimethylsiloxane (also called dimethicone), alkyl silicones, aryl silicones, alkyl aryl silicones, polyethylene glycol dimethicones, polypropylene glycol dimethicones;

waxes such as diester waxes (diesters of alkanediols, diesters of hydroxyl acids), triester waxes (triacylglycerols, triesters of alkane-1,2-diol, of ω-hydroxy acid and fatty acids, esters of hydroxymalonic acid, of fatty acids and alcohols, triesters of hydroxyl acids, of fatty acids and fatty alcohols, triesters of fatty acids, of hydroxyl acids and diols) and polyester waxes (polyesters of fatty acids). For example, the esters of fatty acids able to be used as waxes in the invention are cetyl palmitate, cetyl octanoate, cetyl laurate, cetyl lactate, cetyl isononanoate, cetyl stearate, stearyl stearate, myristyl stearate, cetyl myristate, isocetyl stearate, glyceryl trimyristate, glyceryl tripalmitate, glyceryl monostearate or glyceryl and cetyl palmitate;

the fatty acids able to be used as waxes such as cerotic acid, palmitic acid, stearic acid, dihydroxystearic acid, behenic acid, lignoceric acid, arachidic acid, myristic acid, lauric acid, tridecylic acid, pentadecylic acid, margaric acid, nonadecylic acid, heneicosylic acid, tricosylic acid, pentacosylic acid, heptacosylic acid, montanic acid or nonacosylic acid;

the salts of fatty acids, in particular the aluminium salts of fatty acids such as aluminium stearate, hydroxyl aluminium bis(2-ethylhexanoate);

isomerized jojoba oil;

hydrogenated sunflower seed oil;

hydrogenated copra oil;

hydrogenated lanolin oil;

castor oil and derivatives thereof, in particular modified hydrogenated castor oil or compounds obtained by esterification of castor oil with fatty alcohols;

polyurethanes and derivatives thereof;

styrene polymers such as styrene butadiene; and polyolefins such as polyisobutene.

In one embodiment, composition C3 comprises solid particles such as clays, silicas and silicates.

As solid particles able to be used in composition C3, mention can be made of clays and silicates belonging in particular to the category of phyllosilicates (also called sheet silicas). As an example of silicate able to be used in the invention, mention can be made of Bentonite, Hectorite, Attapulgite, Sepiolite, Montmorillonite, Saponite, Sauconite, Nontronite, Kaolinite, Talc, Sepiolite, Chalk. Pyrogenated synthetic silicas can also be used. The previously cited clays, silicates and silicas can advantageously be modified by organic molecules such as polyethers, ethoxylated amides, quaternary ammonium salts, long-chain diamines, long-chain esters, polyethylene glycols, polypropylene glycols.

These particles can be used alone or in a mixture.

In one embodiment, composition C3 comprises at least one polymer having a molecular weight higher than 5000 g·mol$^{-1}$ and solid particles. Any mixture of the previously cited compounds can be used.

Step c)

At step c) of the method of the invention, the size of the droplets of the second emulsion (E2) is refined.

At this step, controlled homogeneous shear can be applied to emulsion (E2), said rate of applied shear being between 110 s$^{-1}$ and 100000 s$^{-1}$.

In one embodiment, the polydisperse double droplets obtained at step b) are subjected to size refining whereby they undergo shear capable of fragmenting them into new double droplets of controlled and homogeneous diameter. Preferably, this fragmentation step is performed using a high-shear cell of Couette type following a method described in patent application EP 15 306 428. 2 (published as EP 3 144 058 A1).

In one embodiment, at step c), the second emulsion (E2) obtained after step b), composed of polydisperse double droplets dispersed in a continuous phase, is subjected to shear in a mixer which applies controlled, homogeneous shear.

Therefore, in this embodiment, at step c) controlled, homogeneous shear is applied to emulsion (E2), said applied shear rate being between 1000 s$^{-1}$ and 100000 s$^{-1}$.

In this embodiment, in a mixer, the shear rate is said to be controlled and homogeneous, independently of time length, when it reaches a maximum value that is the same for all the parts of the emulsion at a given instant which can vary from one point of the emulsion to another. The exact configuration of the mixer is not essential according to the invention, provided that the whole emulsion has been subjected to the same maximum shear on leaving this device. Mixers suitable for performing step c) are notably described in U.S. Pat. No. 5,938,581.

The second emulsion can be subjected to controlled, homogeneous shear when it circulates through a cell formed by:

two concentric rotating cylinders (also called Couette-type mixer);

two parallel rotating discs; or two parallel oscillating plates.

In this embodiment, the shear rate applied to the second emulsion is between 1000 s$^{-1}$ and 100000 s$^{-1}$, preferably between 1000 s$^{-1}$ and 50000 s$^{-1}$, and more preferably between 2000 s$^{-1}$ and 20000 s$^{-1}$.

In this embodiment, at step c), the second emulsion is placed in the mixer and subjected to shear resulting in the formation of the third emulsion. The third emulsion (E3) is chemically the same as the second emulsion (E2) but is composed of monodisperse double droplets whereas emulsion (E2) is composed of polydisperse double droplets. The third emulsion (E3) is typically composed of a dispersion of double droplets comprising a core formed of one or more droplets of composition C1 and of a layer of composition C2 encapsulating said core, said double droplets being dispersed in composition C3.

The difference between the second emulsion and the third emulsion is the size variance of the double droplets: the droplets of the second emulsion are polydisperse in size whereas the droplets of the third emulsion are monodisperse by means of the fragmentation mechanism described above.

Preferably, in this embodiment, the second emulsion is added continuously to the mixer, which means that the amount of double emulsion (E2) fed into the mixer is the same as the amount of third emulsion (E3) leaving the mixer.

Since the size of the droplets of emulsion (E3) essentially corresponds to the size of the droplets of the solid microcapsules after polymerization, it is possible to adjust the size of the microcapsules and the thickness of the shell by adjusting the shear rate at step c), with strong correlation between the reduction in size of the droplets and the increase in shear rate. This makes it possible to adjust the resulting dimensions of the microcapsules by varying the shear rate applied at step c).

In one preferred embodiment, the mixer used at step c) is a mixer of Couette type comprising two concentric cylinders, an outer cylinder of inner radius $R_o$ and an inner cylinder of outer radius $R_i$, the outer cylinder being fixed and the inner cylinder rotating at an angular velocity $\omega$.

A mixer of Couette type adapted for the method of the invention can be supplied by T. S. R. France.

In one embodiment, the angular velocity $\omega$ of the rotating inner cylinder of the Couette-type mixer is equal to or higher than 30 rad·s$^{-1}$.

For example, the angular velocity $\omega$ of the inner rotating cylinder of the Couette-type mixer is about 70 rad·s$^{-1}$.

The dimensions of the outer fixed cylinder of the Couette-type mixer can be chosen to modulate the space ($d=R_o-R_i$) between the inner rotating cylinder and outer fixed cylinder.

In one embodiment, the space ($d=R_o-R_i$) between the two concentric cylinders of the Couette-type mixer is between 50 µm and 1000 µm, preferably between 100 µm and 500 µm, for example between 200 µm and 400 µm.

For example, the distance d between the two concentric cylinders is 100 µm.

In this embodiment, at step c), the second emulsion is fed into the mixer typically via a pump and is directed towards the space between the two concentric cylinders, the outer cylinder being fixed and the inner cylinder rotating at an angular velocity $\omega$.

When the double emulsion reaches the space between the two cylinders, the shear rate applied to said emulsion is given by the following equation:

$$\gamma = \frac{R_i \omega}{(R_o - R_i)}$$

where:
$\omega$ is the angular velocity of the inner rotating cylinder,
$R_o$ is the inner radius of the outer fixed cylinder, and
$R_i$ is the outer radius of the inner rotating cylinder.

In another embodiment, when the viscosity of composition C3 is higher than 2000 mPa·s at 25° C., at step c) a shear rate of less than 1000 s$^{-1}$ is applied to emulsion (E2).

In this embodiment, the fragmentation step c) can be performed using any type of mixer usually used to form emulsions at a shear rate lower than 1000 s$^{-1}$, in which case the viscosity of composition C3 is higher than 2000 mPa·s, namely under conditions such as those described in patent application FR 16 61787.

The geometric characteristics of the double droplets formed on completion of this step will dictate those of the future capsules.

In this embodiment, at step c), emulsion (E2) formed of polydisperse droplets dispersed in a continuous phase, is subjected to shear e.g. in a mixer at a low shear rate, namely lower than 1000 s$^{-1}$.

In this embodiment, the shear rate applied at step c) is between 10 s$^{-1}$ and 1000 s$^{-1}$ for example.

Preferably, the shear rate applied at step c) is strictly lower than 1000 s$^{-1}$.

In this embodiment, the droplets of emulsion (E2) can only be efficiently fragmented into fine, monodisperse droplets of emulsion (E3) if a high shear stress is applied thereto.

The shear stress $\sigma$ applied to a droplet of emulsion (E2) is defined as the tangential force per unit surface area of the droplet resulting from the macroscopic shear applied to the emulsion when mixed at step d).

The shear stress $\sigma$ (expressed in Pa), viscosity of composition C3 $\eta$ (expressed in Pa s) and shear rate $\gamma$ (expressed in s$^{-1}$) applied to emulsion (E2) when mixed at step d) are related by the following equation:

$$\sigma = \eta \gamma$$

Therefore, in this embodiment, the high viscosity of composition C3 allows the application of very high shear stress to the droplets of emulsion (E2) in the mixer, even if the shear rate is low and shear is non-homogeneous.

To implement step c) in this embodiment, it is possible to use any type of mixer usually used to form emulsions, e.g. a mechanical blade mixer, static emulsifier, ultrasonic homogenizer, membrane homogenizer, high-pressure homogenizer, colloidal mixer, high-shear disperser or high-speed homogenizer.

In one preferred embodiment, a simple emulsifier is used such as a mechanical paddle blade mixer or static emulsifier to carry out step c). This is possible since this embodiment does not require either controlled shear or shear greater than 1000 s$^{-1}$.

Step d)

At step d) of the method of the invention, the shell of the solid microcapsules of the invention is crosslinked and hence formed.

This step allows both expected performance levels to be reached for capsule retention and ensured thermodynamic stability thereof, by definitively preventing any destabilization mechanism such as coalescence or maturation.

In one embodiment, when composition C2 comprises a photoinitiator, step d) is a photopolymerization step whereby emulsion (E3) is exposed to a light source able to initiate photopolymerization of composition C2, in particular to a UV light source preferably emitting in the wavelength range of between 100 nm and 400 nm, and in particular for a time of less than a 15 minutes.

In this embodiment, at step d) emulsion (E3) is subjected to photopolymerization, which will allow photopolymerization of composition C2. This step will allow the obtaining of microcapsules encapsulating the water-soluble substance such as defined above.

In one embodiment, at step d) emulsion (E3) is exposed to a light source able to initiate photopolymerization of composition C2.

Preferably, the light source is a UV light source.

In one embodiment, the UV light source emits in the wavelength range of between 100 nm and 400 nm.

In one embodiment, emulsion (E3) is exposed to a light source for a time of less than 15 minutes, preferably for 5 to 10 minutes.

At step d), the shell of the above-mentioned double droplets composed of photo-crosslinkable composition C2, is crosslinked and thereby converted to a viscoelastic polymeric shell encapsulating and protecting the water-soluble substance against release thereof in the absence of mechanical triggering.

In another embodiment, when composition C2 does not comprise a photoinitiator, step d) is a polymerization step without exposure to a light source, the length of time of this polymerization step d) preferably being between 8 hours and 100 hours and/or this step d) is conducted at a temperature of between 20° C. and 80° C.

In this embodiment, polymerization is initiated for example by exposure to heat (thermal initiation) or by mere contacting together of the monomers, polymers and reticulating agents, or with a catalyst. Polymerization time is then generally longer than several hours.

Preferably polymerization step d) of composition C2 is carried out for a time of between 8 hours and 100 hours, at a temperature of between 20° C. and 80° C.

The composition obtained after step d), comprising solid microcapsules dispersed in composition C3, is ready for use and can be used without any additional post-treatment step of the capsules being required.

The thickness of the shell of the microcapsules thus obtained is typically between 0.1 µm and 20 µm, preferably between 0.2 µm and 8 µm, more preferably between 0.2 µm and 5 µm.

In one embodiment, the solid microcapsules obtained after step d) are free of surfactant.

The method of the invention has the advantage of not requiring a surfactant in any of the described steps. With the method of the invention, it is therefore possible to reduce the presence of additives which could modify the properties of the end product obtained after release of the active ingredient.

The present invention also concerns a series (or set) of solid microcapsules able to be obtained with the method such as defined above, wherein each microcapsule comprises:
- a core comprising a composition C1 such as defined above, and
- a solid shell fully encapsulating the core on the periphery thereof, wherein the mean diameter of said microcapsules is between 1 µm and 30 µm, the thickness of the rigid shell is between 0.1 µm and 20 µm, preferably between 0.2 µm and 8 µm, more preferably between 0.2 µm and 5 µm, and the standard deviation in distribution of the diameter of the microcapsules is less than 50%, in particular less than 25%, or less than 1 µm.

Preferably, the solid microcapsules obtained with the method of the invention are formed of a core containing at least one active ingredient (composition C1) and of a solid shell (obtained from composition C2) fully encapsulating said core on the periphery thereof.

As indicated above, with the method of the invention it is possible to obtain monodisperse particles. Therefore, the above-mentioned series of solid microcapsules is formed of a population of particles of monodisperse size. For example, the standard deviation in distribution of the diameter of the microcapsules is less than 50%, in particular less than 25%, or less than 1 µm.

The size distribution of the solid microcapsules can be measured with a light scattering technique using Mastersizer 3000 apparatus (Malvern Instruments) equipped with a Hydro SV measuring cell.

In one embodiment, the above-mentioned solid microcapsules comprise a solid shell that is entirely composed of crosslinked polymer (obtained from composition C2).

As indicated above, with the method of the invention it is possible to obtain solid microcapsules. The present invention therefore also concerns solid microcapsules comprising a core and a solid shell fully encapsulating the core on the periphery thereof, wherein the core is a composition C1 such as defined above, and wherein said solid shell is composed of crosslinked polymer.

the diameter of said microcapsule being between 1 µm and 30 µm and the thickness of the rigid shell being between 0.1 µm and 20 µm, preferably between 0.2 µm and 8 µm, and more preferably between 0.2 µm and 5 µm.

The present invention also concerns a composition comprising a series of solid microcapsules such as defined above.

The expressions «between . . . and . . . », «from . . . to . . . » and «ranging from . . . to . . . » are to be construed as including the limits unless specified otherwise.

The following examples illustrate the present invention without limiting the scope thereof.

EXAMPLES

Example 1: Production of Solid Biodegradable Capsules According to the Invention A mechanical stirrer (Ika Eurostar 20) equipped with an impeller of disperser blade type was used for all mixing steps.

Step a): Preparation of the First Emulsion (E1)

|  | Raw materials | % in composition | % in E1 |
|---|---|---|---|
| Composition C1 | Active ingredient A: Modified polyethylene glycol (Aculyn 44N, Dow) | 20 | 30 |
|  | Deionized water | 80 |  |
| Composition C2 | Oligomer and crosslinker (polyester diacrylate CN 2035, Sartomer) | 97 | 70 |
|  | Photoinitiator (Darocur 1173, BASF) | 3 |  |
|  | Total | 100 | 100 |

Composition C1 was stirred at 1000 rpm until complete homogenization then left to stand for one hour at ambient temperature. Composition C1 was afterwards added dropwise to composition C2 under stirring at 2000 rpm in a ratio of 3:7. This led to obtaining the first emulsion (E1).

Step b): Preparation of the Second Emulsion (E2)

|  | Raw materials | % |
|---|---|---|
| First emulsion |  — | 5 |
| Composition C3 | Sodium alginate (Sigma Aldrich) | 9.5 |
|  | Deionized water | 85.5 |
|  | Total | 100 |

Composition C3 was stirred at 1000 rpm until complete homogenization then left to stand for one hour at ambient temperature. The first emulsion (E1) was afterwards added dropwise to composition C3 under stirring at 1000 rpm. This led to obtaining the second emulsion (E2).

Step c): Size Refining of the Second Emulsion

The polydisperse second emulsion (E2) obtained at the preceding step was stirred at 1000 rpm for 10 minutes. A resulting monodisperse emulsion (E3) was obtained.

Step d): Crosslinking of the Shell of the Capsules

The monodisperse second emulsion (E3), obtained at the preceding step was irradiated for 10 minutes with a UV light source (Dymax LightBox ECE 2000) having a maximum light intensity of 0.1 W/cm² at a wavelength of 365 nm.

The microcapsules obtained showed good size distribution, namely a mean size of 15 µm and the standard deviation of size distribution was 6.1 µm i.e. 41%.

For biodegradation tests, the microcapsules were washed by conducting several centrifugation-redispersion steps for full removal of alginate. A soil sample was taken and purified to extract the bacterial content therefrom, and placed in a liquid culture medium containing the microcapsules of the invention as sole carbon source. After an incubation time of 5 days at ambient temperature, the microcapsules were imaged under an optical microscope and electron scanning microscope. A biofilm was observed on the microcapsules, indicating the proliferation of bacteria from the carbon source represented by the shell. Traces of erosion and fractures were observed on the shell of the microcapsules, confirming bacterial digestion of the microcapsules.

Example 2: Production of Biodegradable Solid Polyester Capsules According to the Invention A mechanical stirrer (Ika Eurostar 20) equipped with an impeller of disperser blade type was used for all mixing steps.

Step a): Preparation of the First Emulsion (E1)

|  | Raw materials | % in composition | % in E1 |
|---|---|---|---|
| Composition C1 | Active ingredient A: Modified polyethylene glycol (Aculyn 44N, Dow) | 20 | 50 |
|  | Deionized water | 80 |  |
| Composition C2 | Oligomer and crosslinker (polyester acrylate Photomer 5432, IGM resins) | 97 | 50 |
|  | Photoinitiator (Darocur 1173, BASF) | 3 |  |
|  | Total | 100 | 100 |

Compositions C1 and C2 were stirred at 2000 rpm until complete homogenization. Composition C1 was afterwards added dropwise to composition C2 under stirring at 2000 rpm in a ratio of 5:5. This led to obtaining the first emulsion (E1).

Step b): Preparation of the Second Emulsion (E2)

|  | Raw materials | % |
|---|---|---|
| First emulsion E1 | — | 5 |
| Composition C3 | Sodium alginate (J&H CHEM 300-400) | 4.75 |
|  | Deionized water | 90.25 |
|  | Total | 100 |

Composition C3 was stirred at 3500 rpm until complete homogenization then left to stand for one hour at ambient temperature. The first emulsion (E1) was afterwards added to composition C3 and stirred at 2000 rpm. This led to obtaining the second emulsion (E2).

Step c): Size Refining of the Second Emulsion

The second polydisperse emulsion (E2) obtained after the preceding step was stirred at 2000 rpm for 3 minutes. A resulting monodisperse emulsion (E3) was obtained.

Step d): Crosslinking of the Shell of the Capsules

The second monodisperse emulsion (E3), obtained at the preceding step, was irradiated for 10 minutes with a UV light source (Dymax LightBox ECE 2000) having a maximum light intensity of 0.1 W/cm² at a wavelength of 365 nm.

The microcapsules obtained exhibited good size distribution, namely a mean size of 5 µm and the standard deviation of their size distribution was 1 µm i.e. 20%.

For biodegradation tests, the microcapsules were washed using several centrifugation-redispersion steps for complete removal of alginate.

BioDScreen® analysis was performed to determine aerobic biodegradability of the microcapsules. The BioDScreen® (Scanae) method is a screening method of microplate format using fluorescence detection.

BioDScreen® is based on the use of a bioreagent derived from resazurin sensitive to the metabolic activity of bacteria; this reagent is reduced to a fluorescent form proportional to the bacterial degradation of the sample.

Biodegradability rates correspond to analysis of biodegradability with the BioDScreen®-A method over 10 days of incubation at 30° C., with an inoculum derived from a wastewater treatment station.

In Example 2, the biodegradability rate after an incubation time of 10 days was 45% with a standard deviation of 3% and plateau reached after 4 h.

Example 3: Production of Biodegradable Solid Polyepoxy Capsules According to the Invention A mechanical stirrer (Ika Eurostar 20) equipped with an impeller of disperser blade type was used for all mixing steps.

Step a): Preparation of the First Emulsion (E1)

|  | Raw materials | % in composition | % in E1 |
|---|---|---|---|
| Composition C1 | Active ingredient A: Modified polyethylene glycol (Aculyn 44N, Dow) | 16 | 50 |
|  | Deionized water | 84 |  |
| Composition C2 | Oligomer and crosslinker (epoxy diacrylate Photomer 3016, IGM resins/Propoxylated glyceryl triacrylate, SR9020, Sartomer) | 97 | 50 |
|  | Photoinitiator (Darocur 1173, BASF) | 3 |  |
|  | Total | 100 | 100 |

Compositions C1 and C2 were stirred at 2000 rpm until complete homogenization. Composition C1 was afterwards added dropwise to composition C2 under stirring at 2000 rpm in a ratio of 5:5. This led to obtaining the first emulsion (E1).

Step b): Preparation of the Second Emulsion (E2)

|  | Raw materials | % |
|---|---|---|
| First emulsion E1 | — | 5 |
| Composition C3 | Sodium alginate (J&H CHEM 10-50) | 7.6 |
|  | Deionized water | 92.4 |
| Total |  | 100 |

Composition C3 was stirred at 3500 rpm until complete homogenization then left to stand for one hour at ambient temperature. The first emulsion (E1) was afterwards added to composition C3 and stirred at 2000 rpm. This led to obtaining the second emulsion (E2).

Step c): Size Refining of the Second Emulsion

The second polydisperse emulsion (E2) obtained at the preceding step was stirred at 2000 rpm for 3 minutes. A resulting monodisperse emulsion (E3) was obtained.

Step d): Crosslinking of the Shell of the Capsules

The second monodisperse emulsion (E3), obtained at the preceding step was irradiated for 10 minutes with a UV light source (Dymax LightBox ECE 2000) having a maximum light intensity of 0.1 W/cm$^2$ at a wavelength of 365 nm.

The microcapsules obtained exhibited good size distribution, namely a mean size of 8 μm and their size distribution showed a standard deviation of 1.4 μm i.e. 18%.

For the biodegradation tests, the microcapsules were washed with several centrifugation-redispersion steps for complete removal of alginate. BioDScreen® (Scanae) analysis was conducted to determine the aerobic biodegradability of the microcapsules, in accordance with the indications given above in Example 2.

The rate of biodegradability after an incubation time of 10 days was 31% with a standard deviation of 3%.

The invention claimed is:

1. A method for preparing biodegradable solid microcapsules, comprising the following steps:
    a) under stirring, adding a composition C1 comprising at least one active ingredient to a polymeric composition C2, compositions C1 and C2 not being miscible with each other,
    the viscosity of composition C2 being between 500 mPa·s and 100 000 mPa·s at 25° C., composition C2 comprising:
        at least one monomer or polymer selected from the group consisting of: aliphatic esters or polyesters, anhydrides or polyanhydrides, saccharides or polysaccharides, ethers or polyethers, and amides or polyamides, additionally carrying at least one function selected from the group consisting of: acrylate, methacrylate, vinyl ether, N-vinyl ether, epoxy, amine, lactone functions, and mixtures thereof, said monomer or polymer not carrying a urethane function,
        at least one crosslinking agent, and
        optionally at least one photoinitiator or crosslinking catalyst,
    after which an emulsion (E1) is obtained comprising droplets of composition C1 dispersed in composition C2;
    b) under stirring, adding emulsion (E1) to a composition C3, compositions C2 and C3 not being miscible with each other,
    the viscosity of composition C3 being between 3,000 mPa·s and 100 000 mPa·s at 25° C.,
    after which a double emulsion (E2) is obtained comprising droplets dispersed in composition C3;
    c) applying shear to emulsion (E2), with a shear rate less than 1,000 s$^{-1}$,
    after which a double emulsion (E3) is obtained comprising droplets of controlled size dispersed in composition C3; and
    d) polymerizing composition C2, after which biodegradable solid microcapsules are obtained dispersed in composition C3,
    wherein the microcapsules have a level of biodegradation after 28 days of more than 10% according to OECD 301 F guidelines.

2. The method according to claim 1, wherein composition C2 comprises from 0.001% to 20% by weight of crosslinking agent(s) relative to the total weight of said composition.

3. The method according to claim 1, wherein, when composition C2 comprises a photoinitiator, step d) is a photopolymerization step whereby emulsion (E3) is exposed to a light source capable of initiating the photopolymerization of composition C2.

4. The method according to claim 1, wherein, when composition C2 does not comprise a photoinitiator, step d) is a polymerization step without exposure to a light source.

5. The method according to claim 1, wherein composition C3 also comprises at least one branched polymer and/or at least one polymer having a molecular weight higher than 5 000 g·mol$^{-1}$, and/or solid particles.

6. A series of biodegradable solid microcapsules, wherein each biodegradable solid microcapsule comprises:
    a core comprising composition C1 according to claim 1, and
    a solid shell fully encapsulating the core on the periphery thereof, said shell being obtained from the composition C2 according to claim 1,
    wherein the mean diameter of said biodegradable solid microcapsules is between 10 μm and 30 μm, the thickness of the rigid shell is between 1 μm and 20 μm and the standard deviation of the diameter distribution of the biodegradable solid microcapsules is less than 50%, or less than 1 μm.

7. A composition comprising a series of biodegradable solid microcapsules according to claim 6.

* * * * *